Aug. 15, 1950            C. H. H. RODANET            2,518,722
CONTROL SWITCH FOR TURN INDICATORS IN MOTOR VEHICLES
Filed May 18, 1948                                          2 Sheets-Sheet 1
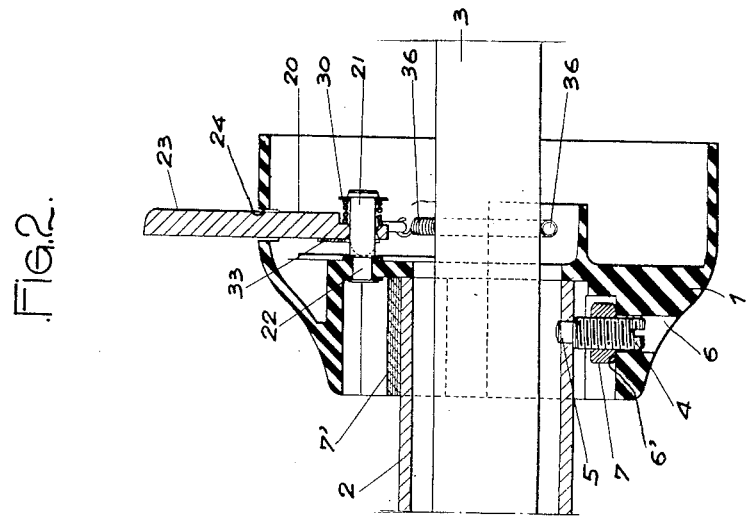
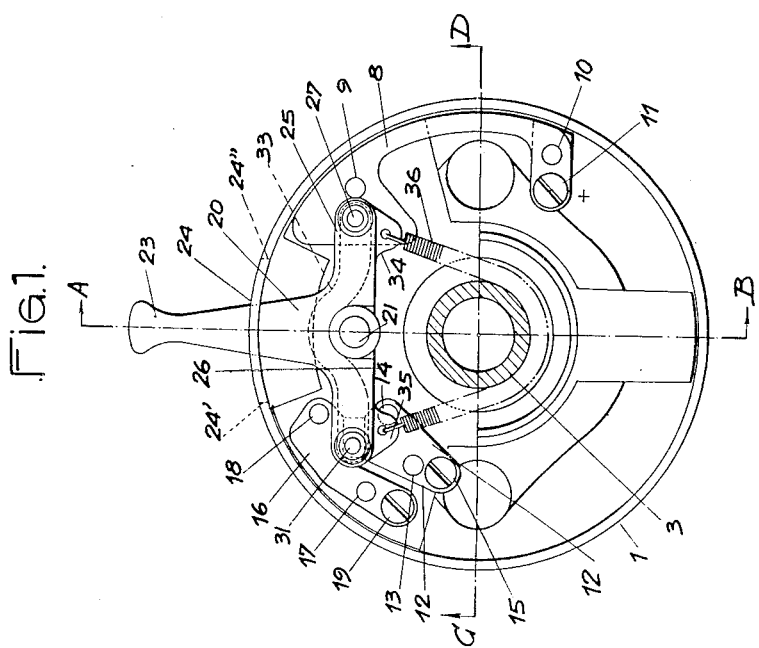
INVENTOR
CHARLES H.H. RODANET
By Haseltine Lake & Co
AGENTS

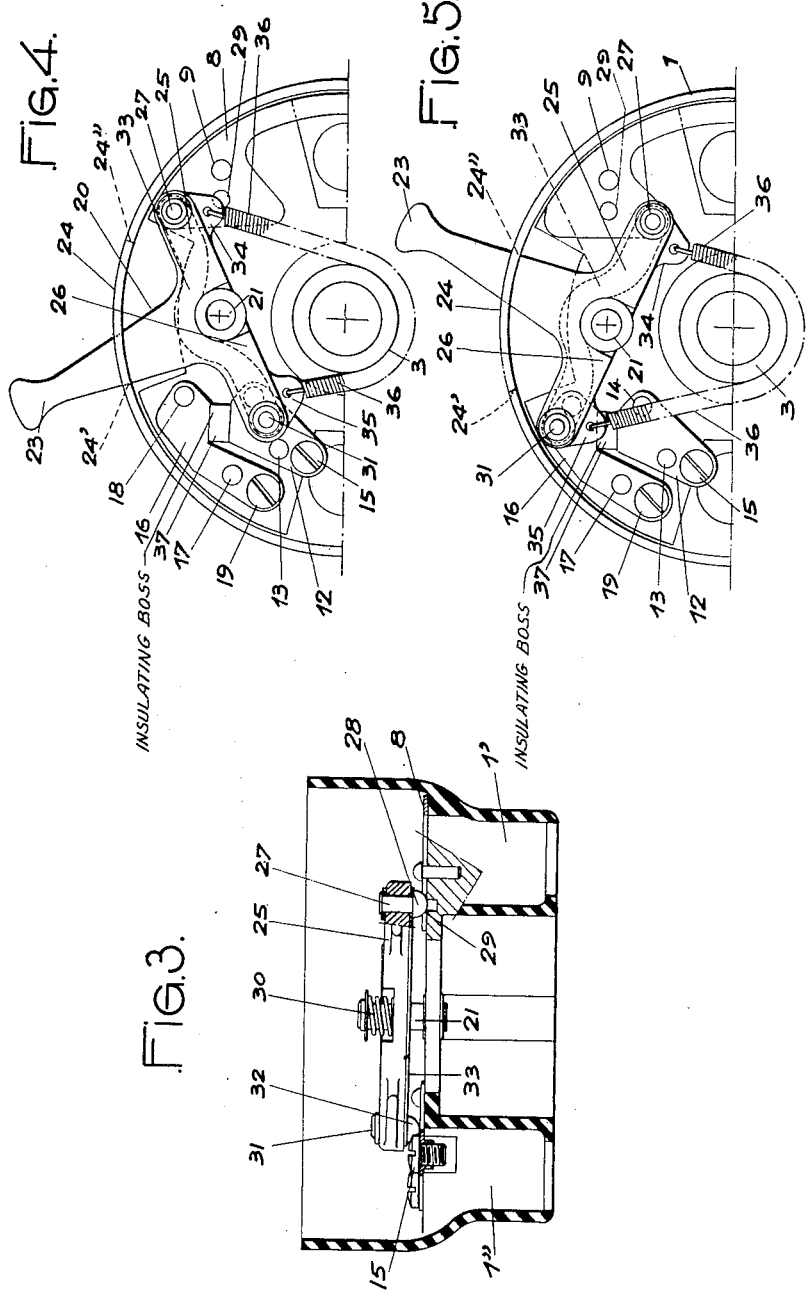

Patented Aug. 15, 1950

2,518,722

UNITED STATES PATENT OFFICE 2,518,722

CONTROL SWITCH FOR TURN INDICATORS IN MOTOR VEHICLES

Charles Hilaire Henri Rodanet, Neuilly-sur-Seine, France, assignor to Etablissements Ed. Jaeger, Levallois-Perret, France, a company Application May 18, 1948, Serial No. 27,726
In France June 10, 1947

1 Claim. (Cl. 200—59)

The present invention relates to a control switch for turn-indicators as used in motor-vehicles, that is a switch used to cause the display, at the driver's will, of either the left hand signal or the right-hand signal serving on the vehicle to indicate to other vehicles or pedestrians on the road that the vehicle is about to turn left or right.

A great many types of switches of this kind are in existence. Some of them, after the vehicle has completed its turn, have to be restored to their initial position by hand so that the turn-indicator in turn should cease providing its display. Other turn-indicator control-switches return to their initial position automatically, for instance after a certain time, in particular under the control of a time counter, or under the effect of a cam, a tooth or a similar element carried by a movable member of the steering-gear and automatically restoring the switch to its initial rest position when, the steering mechanism has returned to its position of straight-line driving after completion of the turn.

The control-switch according to the present invention is of the type adapted to automatically return to its initial inactive position under the action of the steering-gear mechanism when the driver restores said mechanism to its position of straight-line driving after completion of the turn.

The main object of the invention is to provide a control switch of the character described wherein the actuating member of the switch is connected with one of the movable elements of the steering-gear of the vehicle through a connecting system including friction means, through the medium of which, after the switch has been operated by the driver prior to veering, said movable element restores the switch-actuating member to its initial inactive position without the driver having again to intervene as the steering mechanism returns to its straight-line drive position the vehicle having completed its turn.

Another object of the present invention is to provide a control-switch of the character described wherein the friction means may be formed by a flexible band or a coil spring partially surrounding the steering tube and having its ends secured to the actuating handle of the switch. The invention thus makes it possible to mount the latter without having in any manner to perforate or modify the movable steering tube.

The ensuing description made in reference with the accompanying drawings given by way of non-restrictive examples will clearly show in what way the invention may be performed.

Fig. 1 is a plan view of the control switch mounted on the steering mechanism of a motor-vehicle.

Fig. 2 is a vertical cross-section on the line A—B of Fig. 1.

Fig. 3 is a vertical cross-section on the line C—D of Fig. 1.

Fig. 4 is a partial plan view illustrating the actuating handle in its left-hand position.

Fig. 5 is a partial plan view illustrating the actuating handle in its right-hand position.

The switch comprises a casing 1 centrally perforated so as to allow the passage through such central aperture of the fixed tube 2 of the steering-gear of the vehicle. Within said tube 2 extends the movable tube 3 of said steering gear on the end of which the steering wheel (not shown) is mounted. The casing 1 is secured to the fixed tube 2 by means of a screw 4 which at its front end carries a stud 5 through which it engages without play a hole perforated for that purpose in the tube 2, the body of the screw 4 passing with play through the hole 6 perforated in the casing 1. Blocking is obtained by means of a nut 7 threaded onto the screw so as to cause it to abut against the inner wall 6' of its recess, this being effective to clamp a gasket 7' between the body of the casing and the tube 2 over a portion of its periphery, according to a well-known manner of securing a part to a tube. The location of the hole in which the stud 5 is engaged may be such that the end of the fixed tube 2 of the steering mechanism will abut against the under face of the bottom wall of the casing 1. In any case it will be seen that securing the casing does not require any modification of the movable tube 3. The casing 1 is made of an insulating material, for instance a molded plastic, more particularly a synthetic resin-base material.

Within that casing the following fixed contact elements are arranged:

The part 8 formed by a strip of small thickness secured by means of grooved pins 9 and 10 to the bottom wall of the casing 1 and carrying at one of its ends a screw 11 serving as an electrical terminal for connecting the switch to the positive terminal of a source of current;

The part 12 made of a thin metal stamping likewise secured, through grooved pins 13 and 14, to the end-wall of the casing 1 and carrying at one of its ends a screw 15 serving as a terminal for connecting the switch with the left-hand turn indicator;

The part 16 also made of a thin sheet metal secured, through grooved pins 18 and 17, to the end-wall of the casing and carrying at one of its ends a screw 19 serving as an electric terminal for connecting the switch to the right-hand turn indicator.

Outlet conduits 1' and 1'' have been provided in the end-wall of the casing for the passing of the cables connecting the terminal 11 on the one side, and the terminals 15 and 19 on the other side, with the source of current and the turn indicators.

A cover, not shown in the drawings and made of any suitable material identical with or different from that of the casing 1, provides for closure of the casing at its top. It must of course comprise an opening for the passage of the steering tube 3.

Within the casing 1 an actuating hand-lever 20 is pivoted about a pin 21 riveted at one of its ends 22 to the end-wall of the casing 1. Said hand-lever 20 carries at one end an arm 23 projecting from the casing 1 through a slot 24, and at the other end a pair of side arms 25 and 26. The arm 25 carries adjacent its end, as shown in particular in Fig. 3, a metallic part or finger 27 secured to said arm e. g. through a rivet. The lower end 28 of the finger 27 is convex, for instance spherical, and normally bears on the contact strip 8 under the action of a spring 30 mounted on the pin 21 so as to urge the hand-lever 20 against the end-wall of the casing 1. In the position shown in Figures 1 to 3, the contact finger 27 projects into a perforation 29 of the contact strip 8 in which it is resiliently retained by the action of the spring 30.

The arm 26 of the hand-lever which is symmetrical with the arm 25 carries a metallic part 31 similar to the finger 27 and provided like the latter with a convex head 32 applied against the end-wall of the casing under the action of the spring 30.

The fingers 27 and 31 are electrically interconnected through electric connecting means 33 formed by a strip applied along the arms 25 and 26 and extending around the pivot pin 21.

On each of the arms 25 and 26, ears 34 and 35 respectively are furthermore provided, to which the hook-shaped ends of a coil spring 36 are attached; said spring is rotatable around the movable tube 3 of the steering gear of the vehicle, being applied against a portion of the periphery of said tube. The length of the spring 36 is so calculated that said spring is slightly stretched and frictionally engages the tube 3.

The contact plates 12, 16 and 8 are in relief with respect to the end-wall of the casing, as will be seen from Figures 2 and 3. Only an insulating boss designated 37, integral with the end-wall of the casing, forms the passage between the plates 12 and 16, its upper face being flush with that of said plates.

In such conditions, the hand-lever 20 may occupy the following different positions:

(1) The position shown in Figs. 1 and 3 wherein the contact finger 31 through its ball portion 32 bears on the insulating flat part 37 located between the strips 12 and 16 and of the same height as the latter, the hand-lever 20 being resiliently retained in this position because under the urge of the spring 30 of the contact finger 27, penetrating with its ball portion into the hole 29.

(2) The position shown in Fig. 4 wherein the hand-lever 20 has been shifted to the left and the contact finger 31—32 bears on the contact strip 12, while the contact finger 27—28 is clear of the hole 29 and rests against the upper face of the contact strip 8 adjacent the hole 29.

(3) The position shown in Fig. 5 wherein the hand-lever 20 has been shifted to the right and the contact finger 31—32 bears on the contact strip 16, the contact finger 27—28 again resting on the top face of the contact strip 8 but on the other side of the hole 29.

This switch operates as follows:

When the driver intends to turn left, he shifts the hand-lever 20 to the left, as far, or substantially as far, as the left-hand end 24' of the slot 24, this being effective to complete the following control circuit for the left-hand turn indicator: from positive terminal of the source through terminal 11, strip 8, contact finger 28—27, strip 25, contact finger 31—32, strip 12, terminal 15, left-hand turn indicator and back to the negative terminal of the source.

Pivoting of the hand-lever 20 towards the left, that is counter-clockwise, is effective to cause the spring 36 to slide around the steering tube 3 in the same direction, with a frictional engagement of said tube. It is of course impossible to drive the movable steering tube 3 in this rotation through such friction, owing to the resistance opposed by the steering mechanism being far too large.

To then urge the vehicle on its turn indicated as above, the driver rotates the wheel to the left, that is he drives the tube 3 in a counter-clockwise rotation. The friction exerted by the tube on the spring 36 tends to carry the latter also in a counter-clockwise direction, this remaining without effect because the hand-lever 20 is stopped through abutment of its arm 23 against the end 24' of the slot 24 of the casing 1.

After the turn has been completed, and the driver has restored the steering gear of the vehicle to its straight-line drive position, the rotation imparted by the driver through the steering wheel to the tube 3 is effective to frictionally rotate the spring 36 in a clockwise direction, and thus to restore the switch lever 20 to its inoperative intermediate position shown in Fig. 1. Having reached this position, the hand-lever is latched through engagement of its contact-finger 27—28 in the hole 29 under the action of the spring 30. At the same time, the contact-finger 31—32 has been restored and replaced upon the insulating portion 37 which separates the contact switches 12 and 16, this being effective to break the control circuit for the left-hand turn indicator which then ceases to display a turn signal.

The switch therefore has been restored to its inoperative position without the driver intervening.

From this moment on, the friction exerted between the spring 36 and the tube 3 is no longer strong enough to overcome the resistance opposed to any movement of the hand-lever 20 by its blocking device, and the switch remains in its inoperative position regardless of the movements effected by the movable tube 3.

When the driver wishes to turn right, he shifts the hand-lever 20 to the right until it engages the right-hand end 24'' of the slot 24, the effect of this being to cause the contact-finger 31—32 to shift to the contact strip 16 and thus complete the following control circuit: from terminal 11 through strip 8, contact finger 28—27, strip 25, contact finger 31—32, strip 16, terminal 19 to right-hand turn indicator and back to the negative terminal of the source.

In this movement again the hand-lever 20 rubs against the movable tube 3 without rotating it.

To then urge the vehicle in the turn thus announced, the driver turns the wheels right, that is drives the tube 3 in a clockwise rotation. The friction exerted by the tube upon the spring 36 again remains without effect, because the hand-lever 20 is stopped by abutment of its arm 23 against the right-hand end 24″ of the slot 24 in the casing 1.

The turn having been completed, the driver restores the steering gear of the vehicle to its straight-line drive condition, the rotation imparted by the driver through the wheel to the tube 3 is operative to frictionally drive the spring 36 in a counter-clockwise direction and thus to return the lever of the switch to its intermediate inoperative position in which it is latched, while the contact finger 31—32 is restored and replaced upon the insulating part 37 separating the contact strips 12 and 16, whereby the control circuit for the right-hand turn indicator is broken and this indicator put out of action.

The switch has therefore once again been restored to its inoperative position without the driver intervening. Friction of the spring 36 against the tube 3 being too weak to move the hand-lever out of its latched position, the switch again remains in its inactive position regardless of any movements of the movable tube 3.

If for any reason, the driver, after having actuated the switch in either direction, gives up the idea of turning in that direction, he merely needs restore the switch manually to its initial position in which it is again latched through engagement of the contact finger 27—28 under the action of the spring 30 in the hole 29.

What I claim is:

In a control switch for turn indicators in motor vehicles, a casing of insulating material provided with a central perforation for surrounding the fixed tube of the steering gear of the vehicle, means for fixedly mounting said casing on said fixed tube, an actuating member provided with a double-armed rocking lever pivotally mounted within said casing, contact fingers fitted on each arm of said lever, a supplying contact plate fitted within said casing provided with a perforation engaging one of said fingers when said actuating member is in inoperative position, contact terminals fixedly mounted within said casing and adapted to engage respectively the other finger when said actuating member is pivoted to the left and to the right, and a coil-spring rolled round a portion of the periphery of the movable tube of said steering gear for frictionally engaging said tube and the ends of which are fitted to said arms.

CHARLES HILAIRE HENRI RODANET.

REFERENCES CITED

The following references are of record in the file of this patent:

UNITED STATES PATENTS

| Number | Name | Date |
|---|---|---|
| 1,584,761 | Fischer | May 18, 1926 |
| 1,760,488 | Gallinant | May 27, 1930 |
| 2,296,585 | Tobias | Sept. 22, 1942 |